Figure 1:
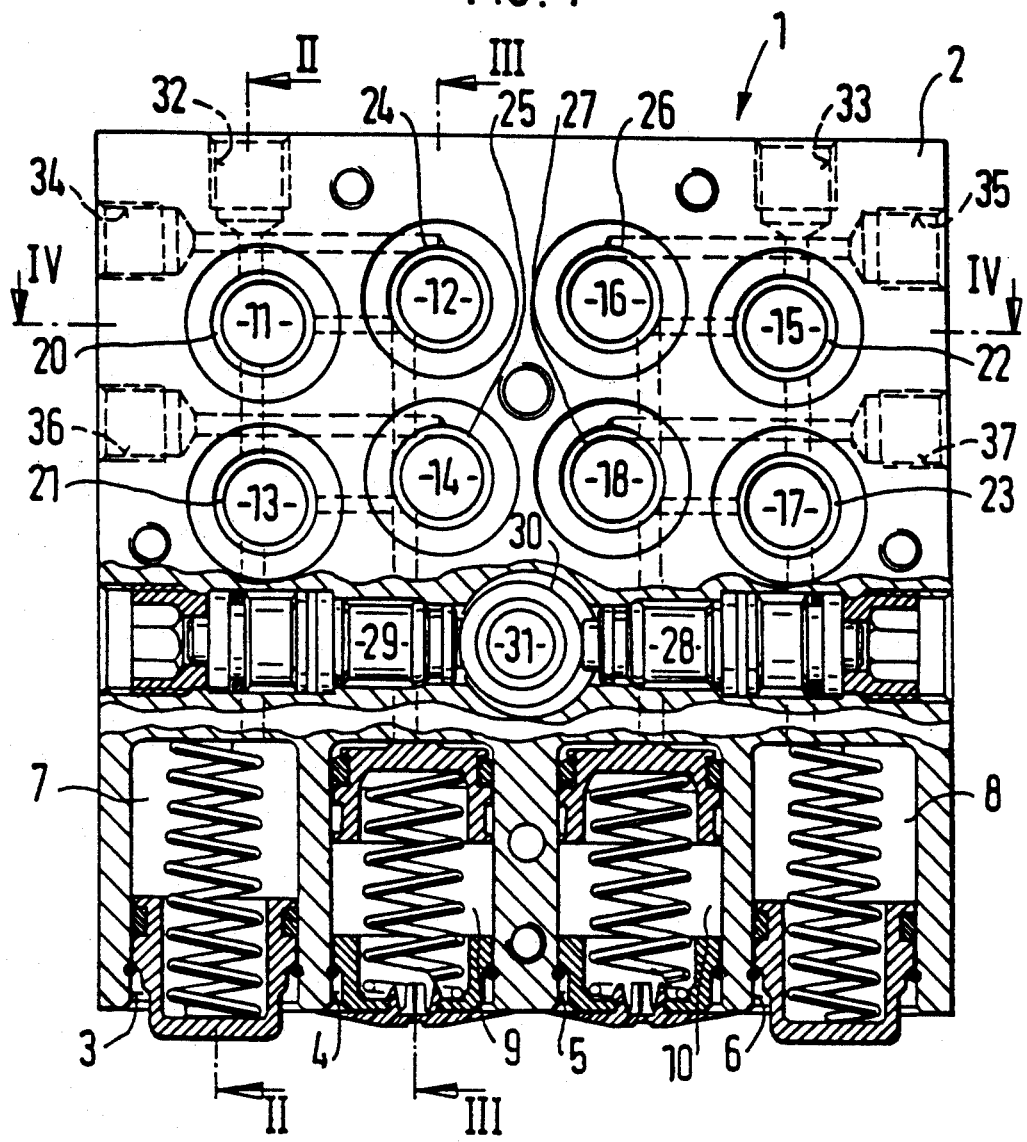

United States Patent [19]
Kehl et al.

[11] Patent Number: 5,244,262
[45] Date of Patent: Sep. 14, 1993

[54] HOUSING BLOCK FOR A HYDRAULIC BRAKING SYSTEM

[75] Inventors: Georg Kehl, Stuttgart; Edgar Schmitt, Vaihingen-Enz; Heinz Siegel, Stuttgart; Peter Eberspaecher, Esslingen; Roland Benzinger, Stuttgart, all of Fed. Rep. of Germany

[73] Assignee: Robert Bosch GmbH, Stuttgart, Fed. Rep. of Germany

[21] Appl. No.: 776,343

[22] PCT Filed: Mar. 22, 1991

[86] PCT No.: PCT/DE91/00253
§ 371 Date: Nov. 22, 1991
§ 102(e) Date: Nov. 22, 1991

[87] PCT Pub. No.: WO91/16220
PCT Pub. Date: Oct. 31, 1991

[30] Foreign Application Priority Data
Apr. 25, 1990 [DE] Fed. Rep. of Germany ....... 4013160

[51] Int. Cl.$^5$ .................................... B60T 8/36
[52] U.S. Cl. ............................. 303/119.2; 137/596.17
[58] Field of Search ................ 303/119 SV, 116 PC, 303/113 R, 87, 119.2, 116.4, 113.1; 137/596.16, 596.17, 884

[56] References Cited

U.S. PATENT DOCUMENTS

| | | | |
|---|---|---|---|
| 3,538,947 | 11/1970 | Leiber | 137/884 X |
| 4,050,749 | 9/1977 | Harries et al. | 303/119 SV |
| 4,568,131 | 2/1986 | Blomberg et al. | 303/119 S V X |
| 5,022,717 | 6/1991 | Heibel et al. | 303/119 SV |
| 5,035,469 | 7/1991 | Geilen et al. | 303/116 R X |

FOREIGN PATENT DOCUMENTS

| | | |
|---|---|---|
| 3609974 | 10/1986 | Fed. Rep. of Germany . |
| 1384566 | 2/1975 | United Kingdom . |
| 2059528 | 4/1981 | United Kingdom ......... 303/119 SV |

Primary Examiner—Robert J. Oberleitner
Assistant Examiner—Peter M. Poon
Attorney, Agent, or Firm—Edwin E. Greigg; Ronald E. Greigg

[57] ABSTRACT

A housing block for a hydraulic braking system which accommodates inlet and outlet solenoid valves in such a way that a flow medium through the inlet and outlet valves is circulated in pairs in immediate succession The inlet solenoid valves are located lower in said housing block than the outlet solenoid valves so that the fluid can flow back to low pressure reservoirs, and air can flow upwards via the outlet solenoid valves to the wheel brake cylinders for the purpose of venting air from the system. The housing block is intended for a hydraulic braking system which is equipped with an anti locking device.

4 Claims, 2 Drawing Sheets

HOUSING BLOCK FOR A HYDRAULIC BRAKING SYSTEM

STATE OF TECHNOLOGY

The invention is directed to a housing block for a hydraulic braking system. Such a housing block is known (DE-A-36 09 974).

Housing blocks of this kind are based on problems related to saving lines, connections and constructional space, and creating a built-in unit which is simple to maintain.

However, a familiar housing block of this kind has the disadvantage that it is difficult to ventilate, and that the fluid flowing back from the wheel brake cylinders finds no permanent slope.

ADVANTAGES OF THE INVENTION

In contrast, the housing block has the advantage that the braking system is easy to ventilate, and that the fluid flowing back from the wheel brake cylinders has a constant slope to the reservoir.

Further advantageous features result from the dependent claims and from the description.

DRAWING

Figure 4:
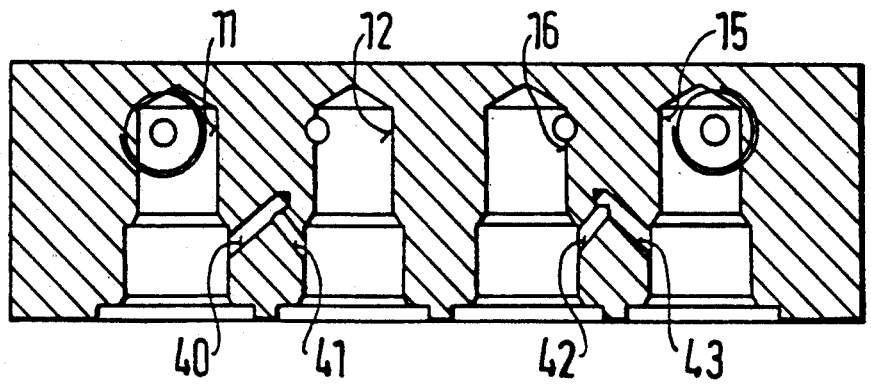
Figure 2:
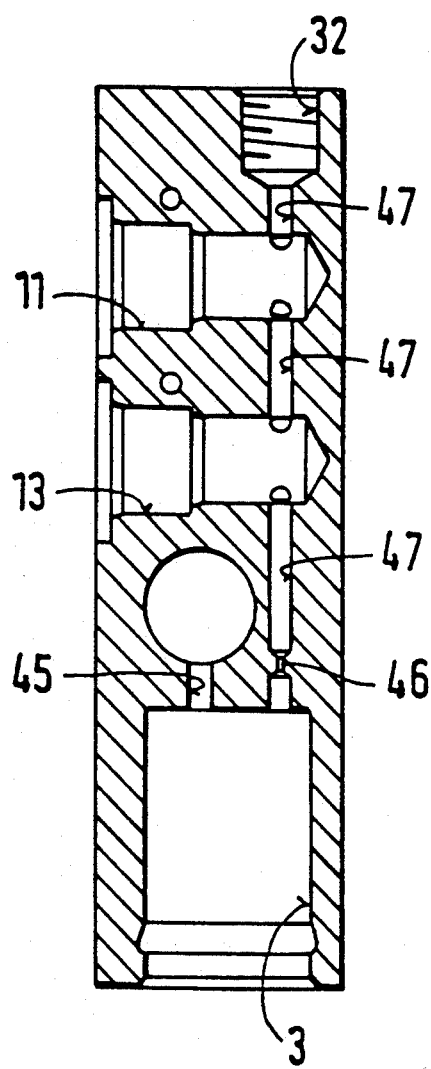
Figure 3:
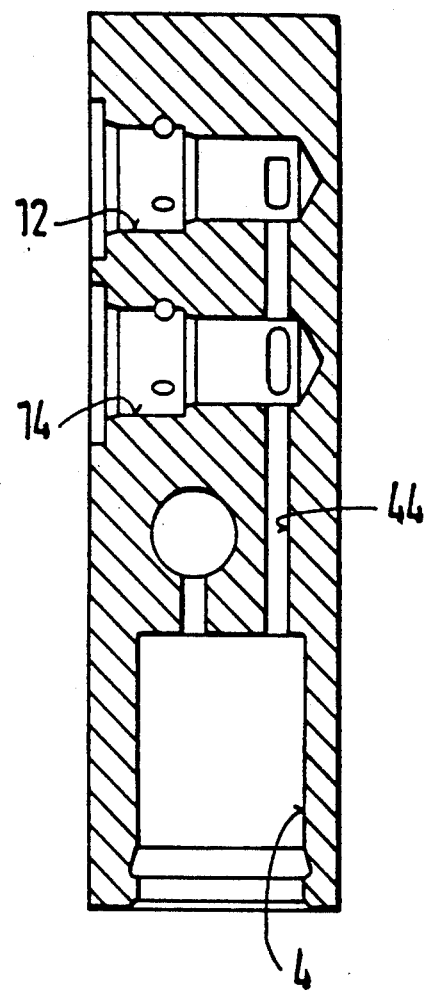

A design example of the invention is represented in the drawing, and described in more detail in the following description. FIG. 1 shows a side view of a housing block, in part cross-section; FIG. 2 shows a sectional view at II— II FIG. 1; FIG. 3 shows a sectional view at III—III in FIG. 1; and FIG. 4 shows a sectional view at IV—IV in FIG. 1.

DESCRIPTION OF THE DESIGN EXAMPLE

A 4-channel housing block 1, with four outlets for the connection of four brake cylinders, has a base plate 2 in which, in the lower narrow side as seen in the drawing, four location bores 3, 4, 5, 6, are provided for two dampers 7 and 8 and for two reservoirs 9 and 10. The location bores for at least one reservoir (9), (10) and for at least one damper (7), (8) in the housing block having longitudinal extensions which are located vertically next to one another on an underside of the housing block. On its vertical broad side, on the other hand, the base plate 2 has eight location holes 11, 12, 13, 14, 15, 16, 17, 18 for eight solenoid valves, that is, four inlet valves 20, 21, 22, 23 and four outlet valves 24, 25, 26, 27. Approximately in the middle of the broad side of the base plate 2 there are two recirculating pumps 28 and 29, which lie opposite each other on the same axis, and an actuating eccentric 30 of a motor 31.

Furthermore, the base plate 2 has on its three other narrow sides six connection holes 32, 33, 34, 35, 36, 37, two (32, 33) for two main cylinders (tandem or parallel arrangement), two (34, 35) for the two wheel brake cylinders of the front wheels, and two (36, 37) for the rear wheels.

As FIG. 1 and the sectional views according to FIGS. 2 and 3 show, in this type of construction the reservoirs/and dampers are located in the lower mounting position, and of the solenoid valves 20 to 27 which lie above them, the outlet solenoid valves 24, 25, 26, 27 lie higher than the inlet solenoid valves 20, 21, 22, 23 which are assigned to them. This has the advantage that when the hydraulic system is vented, the air can flow out via the outlet solenoid valves 24, 25, 26, 27, to the wheel brake cylinders. On the other hand, a slope is created to the reservoir 9 or 10 via a duct 44, via which the fluid can flow back automatically. Fluid can also flow through the dampers 7 or 8 from the recirculating pump, via a duct 45, with the fluid arriving at the main cylinder connection 32 via a throttle 46 and a duct 47 (compare FIG. 2).

The sectional view in accordance with FIG. 4 shows that the location holes 11/12, 13/14, 15/16, 17/18 are connected with one another for one pair each (here 11/12 and 15/16) of inlet and outlet solenoid valves via two inclined ducts 40/41 and 42/43. These inclined ducts 40/41 and 42/43 have no openings to the outside. Plugs and ball seals are therefore superfluous here.

The foregoing relates to a preferred exemplary embodiment of the invention, it being understood that other variants and embodiments thereof are possible within the spirit and scope of the invention, the latter being defined by the appended claims.

We claim:

1. A housing block for a hydraulic braking system with anti-locking wheels, with location holes and location bores which includes hydraulic elements including a pump, reservoirs, dampers and electromagnetic solenoid valves as well as with pressure medium ducts, said location bores for at least one reservoir (9), (10) and for at least one damper (7), (8) in the housing block having longitudinal extensions which are located vertically next to one another on an underside of the housing block, the electromagnetic solenoid valves (20-27) are inlet and outlet solenoid valves which have horizontally aligned longitudinal axes and are joined on one side of said block to work together in pairs for controlling a pressure medium; that each electromagnetic solenoid valve pair (20/24), (21/25), (22/26), (23/27) is connected via ducts (40, 41) and (42, 43) running between the electromagnetic solenoid valve pairs; and that the inlet electromagnetic solenoid valve (20), (21), (22), (23) is in each case located in a first plane lower in said housing block than a second plane parallel with said first plane in which the outlet solenoid valve (24), (25), (26), (27) assigned to said inlet solenoid is located.

2. A housing block in accordance with claim 1, in which said ducts (40, 41, 42, 43) are at least partly designed as partial channels going from location holes (11, 12, 13, 14, 15, 16, 17, 18) for the solenoid valves (20-27), without their own external seals.

3. A housing block in accordance with claim 2 in which the pressure medium flows through the location holes for at least one recirculating pump (28, 29), at least one reservoir (9, 10) and at least one damper (7, 8) and for the solenoid valves 20-27).

4. A housing block in accordance with claim 1 in which the pressure medium flows through the location holes for at least one recirculating pump (28), (29), at least one reservoir (9), (10) and at least one damper (7), (8) and for the solenoid valves (20-27).

* * * * *